United States Patent [19]

Lundeen

[11] Patent Number: 4,847,973
[45] Date of Patent: Jul. 18, 1989

[54] METHOD FOR REPAIRING VEHICLE CONTROL CABLE

[76] Inventor: Richard F. Lundeen, 3120 E. Emile Zola, Phoenix, Ariz. 85032

[21] Appl. No.: 180,319

[22] Filed: Apr. 11, 1988

[51] Int. Cl.⁴ .................................................. B23P 6/00
[52] U.S. Cl. .............................. 29/402.08; 29/426.1; 29/426.4; 29/428; 74/502.4; 74/502.6
[58] Field of Search .............. 29/402.08, 426.1, 426.4, 29/425.5, 426.6, 428; 74/502.6, 502.4

[56] References Cited

U.S. PATENT DOCUMENTS 2,957,353 10/1960 Babacz ............................... 74/502.6
4,175,450 11/1979 Bennett .............................. 74/502.4
4,188,836 2/1980 Muller ................................ 74/502.4
4,546,666 10/1985 Second ............................... 74/502.6
4,682,513 7/1987 Reeder ............................... 74/502.4

Primary Examiner—Howard N. Goldberg
Assistant Examiner—Irene Cuda
Attorney, Agent, or Firm—Tod R. Nissle

[57] ABSTRACT

A method and apparatus for repairing a control cable which includes a snap-on portion that has been damaged and rendered unserviceable. The snap-on portion normally fits on a connector in a vehicle. The method and apparatus permit the insertion on the control cable of a replacement snap-on portion without requiring the use of any tools to install the replacement portion on the control cable.

2 Claims, 1 Drawing Sheet

METHOD FOR REPAIRING VEHICLE CONTROL CABLE

This invention relates to a method and apparatus for repairing an original equipment control cable in a vehicle.

More particularly, the invention relates to a method and apparatus for repairing a vehicle control cable including a snap-on portion which has been damaged and rendered unserviceable, the method permitting the insertion on the control cable of a replacement portion without requiring the use of any tools to install the replacement portion on the control cable.

The accelerator, detent, throttle valve and cruise control cables on many recent models of General Motors cars are provided at one end with a clip or snap-on portion and with a ferrule which helps maintain the clip on the cable. The clip snaps onto the cylindrical head of a connector. The head is attached to the throat of the connector and extends outwardly from the throat. The clip is easily broken when a technician attempts to remove the clip from the head of the connector. Once the clip is broken, replacing the control cable requires forty-five to ninety minutes and typically costs in excess of fifty dollars. An alternative to replacing the cable is, of course, to repair the cable. The conventional repair procedure, however, includes grinding the button or ferrule off the end of the cable, inserting a replacement clip on the cable, and crimping a new ferrule on the end of the cable. This procedure takes forty-five minutes or more to complete, and is often not satisfactory because the new ferrule does not stay on the cable unless an expensive crimping tool is utilized to securely fasten the ferrule to the end of the control cable.

Accordingly, it would be highly desirable to provide an improved method and apparatus for repairing a control cable repairing the damaged snap-on portion of a control cable utilized on a vehicle.

Therefore, it is a principle object of the invention to provide an improved method for repairing a control cable in a vehicle.

Another object of the invention is to provide an improved method for replacing the damaged snap-on portion of the control cable of a vehicle, the method not requiring that the button or ferrule at the end of the cable be removed and reinstalled during installation of a replacement snap-on portion on the control cable.

A further object of the invention is to provide an improved method for replacing the damaged snap-on portion of the control cable of a vehicle, the method not requiring the use of tools to install the replacement snap-on portion on the control cable.

Still another object of the invention is to provide a method for repairing an original equipment control cable in a vehicle which does not require disposal of the old cable and installation of a brand new cable.

These and other, further and more specific objects and advantages of the invention will be apparent to those skilled in the art from the following detailed description thereof, taken in conjunction with the drawings, in which.

Figure 1:
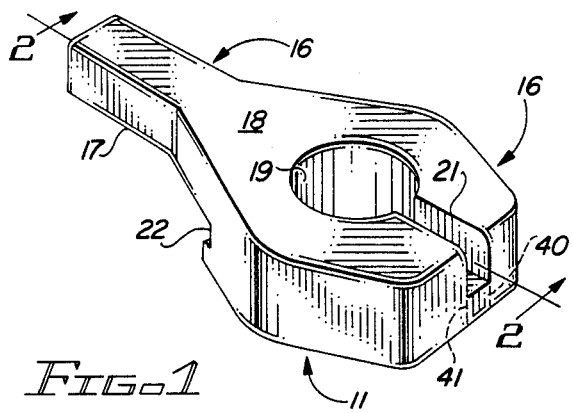
FIG. 1 is a perspective view illustrating a replacement snap-on portion constructed in accordance with the principles of the invention.
Figure 2:
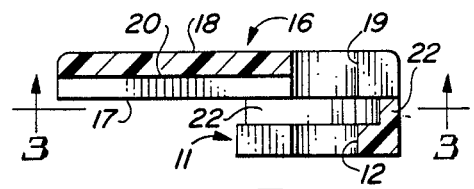
FIG. 2 is a section view of the replacement snap-on portion of FIG. 1 taken along section line 2—2 thereof and further illustrating internal construction details thereof.
Figure 3:
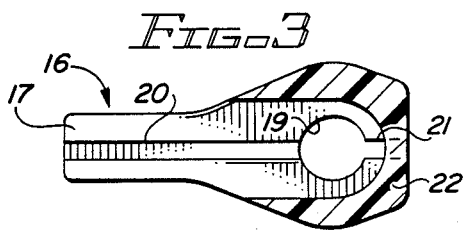
FIG. 3 is a section view of the replacement snap-on portion of FIG. 2 taken along section line 3—3 thereof and further illustrating construction details thereof.
Figure 4:
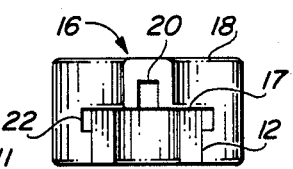
FIG. 4 is a top plan view of the snap-on portion of FIG. 1 further illustrating the construction thereof.
Figure 4:
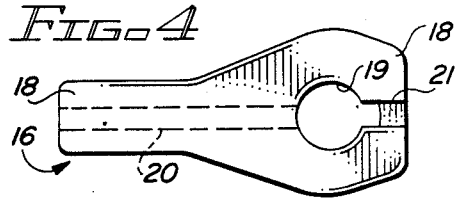
Figures 6, 7:
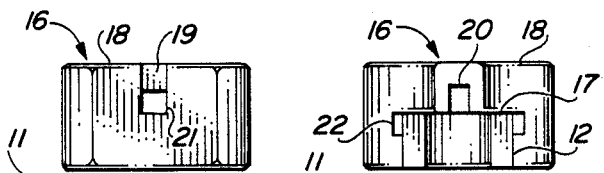
FIG. 6 is a right hand side view of the snap-on portion of FIG. 1.
FIG. 7 is a left hand side view of the snap-on portion of FIG. 1.
Figure 5:
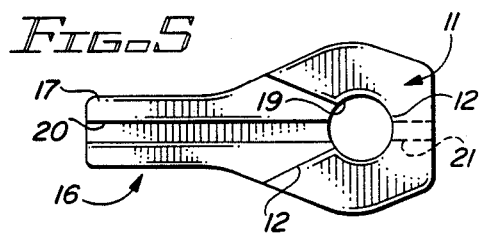
FIG. 5 is a bottom plan view of the replacement snap-on portion of FIG. 1.

Briefly, in accordance with my invention, I provide a repaired vehicle control cable for attachment to a connector in a vehicle. The connector comprises a neck and a head attached to and outwardly extending from the neck. The control cable includes a snap-on portion and a button attached to one end of the cable. The snap-on portion includes a mouth shaped and dimensioned to snap onto the head of the connector, the mouth including spaced apart top and bottom walls and a side wall partially circumscribing and interconnecting the top and bottom walls, the lower wall including a floor extending outwardly from the mouth; and, an aperture in the top wall sized to fit around the neck when the connector head is snap fit into the mouth. The snap-on portion has been damaged and rendered unserviceable and removed from the cable, and a replacement portion has replaced the damaged snap-on portion to permit reuse of the control cable. The replacement portion includes an upper wall with a first passageway sized to fit around the neck of the connector; a lower wall spaced apart from the upper wall and having a floor and a second passageway formed through the lower wall beneath the upper wall; a first elongate cable receiving groove formed in the floor and extending outwardly away from the second passageway; an intermediate wall interconnecting and partially circumscribing the upper and lower walls; a second elongate cable receiving groove formed in the back of the lower wall and extending outwardly away from the second passageway and from the first elongate cable receiving groove. The upper wall, lower wall, and intermediate wall form an opening shaped and dimensioned to snap onto the head of the connector. The first and second passageways are sized to permit the button to fit therethrough. The first and second cable receiving grooves are aligned such that after the button and the end of the cable are pushed through the first passageway and then the second passageway, the replacement portion is rotated to seat the cable in the first and second cable receiving grooves.

In another embodiment of my invention I provide a method for repairing with a replacement portion a vehicle control cable attached to a connector in a vehicle. The connector comprises a neck and a head attached to and outwardly extending from the neck. The control cable includes a snap-on portion and a button attached to one end of the cable. The snap-on portion includes a mouth shaped and dimensioned to snap onto the head of the connector, the mouth including spaced apart top and bottom walls and a side wall partially circumscribing and interconnecting the top and bottom walls, the lower wall including a floor extending outwardly from the opening; and, an aperture in the top wall sized to fit around the neck when the connector head is snap fit into the mouth. The snap-on portion has been damaged and rendered unserviceable. The replacement portion includes an upper wall with a first passageway sized to fit around the neck of the connector; a lower wall spaced apart from the upper wall and having a floor, a bottom, and a second passageway formed through the lower wall beneath the upper wall; a first elongate cable receiving groove formed in the floor and extending outwardly away from the second passageway; an intermediate wall interconnecting and partially circumscribing the upper and lower walls; a second elongate cable receiving groove formed in the back of the lower wall and extending outwardly away from the second passageway and the first elongate cable receiving groove. The upper wall, the lower wall, and intermediate wall forming an opening shaped and dimensioned to snap onto the head of the connector. The first and second passageways are sized to permit the button to fit herethrough. The first and second cable receiving grooves are aligned such that after the button and the end of the cable are pushed through the first passageway and then the second passageway, the replacement portion is rotated to position the button against the side wall with the cable extending from the button through the first and second cable receiving grooves and second passageway. The method comprises the steps of removing the snap-on portion from the cable; pushing the button and the end of the cable through the first passageway and then the second passageway of the replacement portion; rotating the replacement portion until the end of the cable seats in the first and second cable receiving grooves; and, sliding the replacement portion along the cable until the button seats against the intermediate wall. The connector can be attached to the carburetor of a vehicle.

Turning now to the drawings in which the presently preferred embodiments of the invention are shown for the purpose of illustrating the practice thereof and not by way of limitation of the scope of the invention, and in which like reference characters represent corresponding elements throughout the several views, FIGS. 1 to 7 illustrate a replacement snap-on portion constructed in accordance with the principles of the invention and including an upper wall 11 with first passageway 12 sized to fit around the cylindrical neck 13 of a connector 14 (FIG. 9E), a lower wall 16 spaced apart from the upper wall 11 and having a floor 17, a back 18, and a cylindrical passageway 19 formed through floor 17 beneath upper wall 11. A first elongate cable receiving groove 20 is formed in floor 17 and extends outwardly away from cylindrical passageway 19. Intermediate wall 22 interconnects upper wall 11 and lower wall 16. A second elongate cable receiving groove 21 is formed in the back 18 of lower wall 16 and extends outwardly away from second passageway 19 and from the first elongate cable receiving groove 20. The intermediate wall 22 partially circumscribes the upper 11 and lower 16 walls. The upper wall 11, lower wall 16, and intermediate wall 22 collectively form an opening which is shaped and dimensioned to snap onto the cylindrical head 15 of connector 14. The first and second passageways 12 and 19, respectively, are sized to permit the button or ferrule 24 attached to the end of the cable 25 to fit therethrough. The first and second cable receiving grooves 20 and 21, respectively, are aligned such that after the button 24 and end of cable 25 are pushed through the first passageway 12 and then the second passageway 19 in the manner indicated in FIG. 9B, the replacement portion can be rotated in the direction of arrow A in FIG. 9C to seat the end of the cable 25 in grooves 20 and 21.

Figure 8:
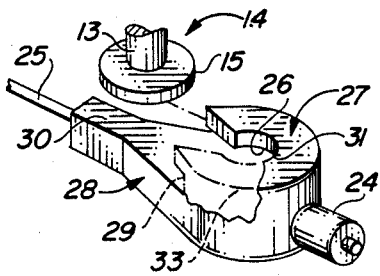
FIG. 8 is a perspective view illustrating a prior art control cable snap-on portion and the connector head to which the snap on portion is attached.
Figure 9A:
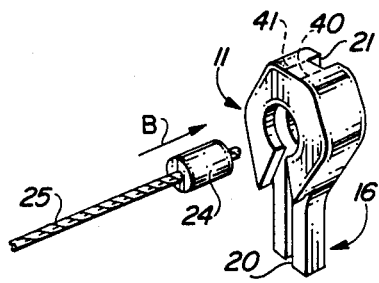
FIGS. 9A to 9E illustrate the installation of the replacement snap-on portion of the invention of an vehicle control cable.
Figure 9B:
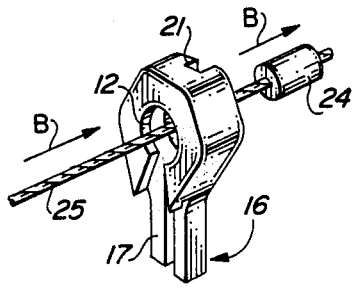
Figure 9C:
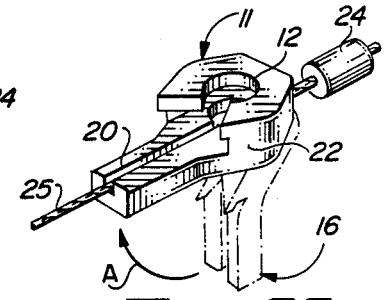
Figure 9D:
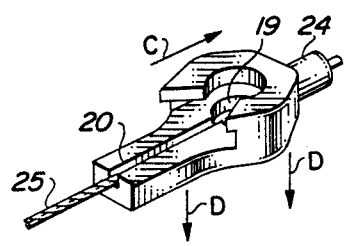
Figure 9E:
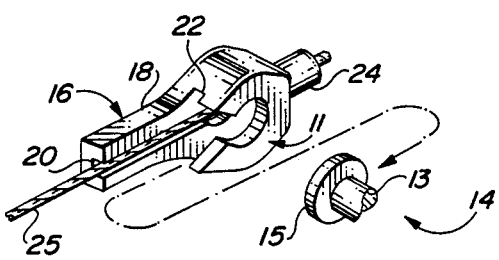

A prior art snap-on portion is illustrated in FIG. 8 and includes a mouth 26 shaped and dimensioned to snap-on the cylindrical head 15 of connector 14; a top wall 27; a floor 30 on the bottom wall 28 extending outwardly from the mouth; and, an aperture 31 in top wall 27 sized to fit around the neck 13 when the cylindrical connector head 15 is snap fit into the mouth 26. When a mechanic attempts to remove the snap-on portion of FIG. 8 from a connector head 15, a portion or piece of the snap-on portion is often broken away. Dashed lines 33 in FIG. 8 indicate a section of the snap-on portion which has broken off during removal of the snap-on portion from head 15. In the method of the invention, a damaged and unserviceable snap-on portion of the type illustrated in FIG. 8 is cut off or otherwise removed from cable 25. The replacement snap-on portion of the invention is then installed on the end of cable 25 in the manner illustrated in FIGS. 9A to 9E. In FIG. 9A, the replacement snap-on portion is oriented to receive button 24 through passageways 12 and 19. In FIG. 9B, button 24 and cable 25 have been moved through passageways 12 and 19 in the direction of arrows B. After button 24 is pushed through passageways 12 and 19, the replacement snap-on portion is rotated in the manner indicated by arrow A in FIG. 9C, seating cable 25 in the cable receiving grooves 20 and 21. After cable 25 is seated in grooves 20 and 21, the replacement portion is slid along cable 25 in the direction of arrow C to seat intermediate wall 22 against button 24 in the manner indicated in FIG. 9D. The opening formed in the replacement portion by walls 11, 16 and 22 can then be snapped onto the cylindrical head 15 of a connector 14 in the manner indicated in FIG. 9E.

If desired, an additional cable receiving groove can be formed in the replacement portion in the manner indicated by dashed lines 40 and 41 in FIGS. 1 and 9A. If such a groove were cut through upper wall 11, then in FIG. 9D the replacement portion could be removed from cable 25 by simply holding cable 25 fixed and pulling the replacement portion downwardly off of cable 25 in the direction of arrows D. When the replacement portion was pulled from cable 25 in the direction of arrows D, cable 25 would slide upwardly through and out from grooves 20 and 21 and the groove bounded and indicated by dashed lines 40 and 41.

The repaired control cable of the invention can be utilized on the connectors 14 of carburetors in a variety of vehicles including General Motors vehicles with 125 transmissions, 125 L.U. transmissions, 325 transmissions, 325 4L transmissions, 700 R4 transmissions, 250 L.U. transmissions, and 440 T4 transmissions. The replacement snap on portion of the invention can also be utilized on accelerator, detent, and throttle valves in General Motors vehicles.

Having described my invention in such terms as to enable those skilled in the art to understand and practice it, and having identified the presently preferred embodiments thereof,

I claim:

1. A method for repairing with a replacement portion a vehicle control cable attached to a connector in a vehicle, said connector comprising a neck and a head attached to and outwardly extending from said neck, said control cable including a snap-on portion and a button attached to one end of the cable, said snap-on portion including a mouth shaped and dimensioned to snap onto said head of said connector, said mouth including spaced apart top and bottom walls and a side wall partially circumscribing and interconnecting said top and bottom walls, said lower wall including a floor extending outwardly from said opening, and an aperture in said top wall sized to fit around said neck when said connector head is snap fit into said mouth, said snap-on portion having been damaged and rendered unserviceable, said replacement portion including an upper wall with a first passageway sized to fit around said neck of said connector, a lower wall spaced apart from said upper wall and having a floor, a back, and a second passageway formed through said lower wall beneath said upper wall, a first elongate cable receiving groove formed in said floor and extending outwardly away from said second passageway, an intermediate wall interconnecting and partially circumscribing said upper and lower walls, a second elongate cable receiving groove formed in the back of said lower wall and extending outwardly away from said second passageway and said first elongate cable receiving groove, said upper wall, lower wall and intermediate wall collectively forming an opening shaped and dimensioned to snap-onto said head of said connector, said first and second passageways being sized to permit said button to fit therethrough, said first and second cable receiving grooves being aligned such that after said button and said end of said cable are pushed through said first passageway and then said second passageway, said replacement portion is rotated to position said button against said side wall with said cable extending from said button through said first and second cable receiving grooves and said second passageway, said method comprising the steps of (a) removing said snap-on portion from said cable;
  (b) pushing said button and said end of said cable through said first passageway and then said second passageway of said replacement portion;
  (c) rotating said replacement portion until said end of said cable seats in said first and second cable receiving grooves; and,
  (d) sliding said replacement portion along said cable until said button seats against said intermediate wall.

2. The method of claim 1, wherein said connector is attached to the carburetor of a vehicle.

* * * * *